ial AC fields, such

United States Patent [19]
Watson

[11] Patent Number: 4,794,208
[45] Date of Patent: Dec. 27, 1988

[54] FREQUENCY SHIFTING DIGITIZER FOR REDUCING AC FIELDS INTERFERENCE

[75] Inventor: James S. Watson, Phoenix, Ariz.

[73] Assignee: Calcomp Inc., Anaheim, Calif.

[21] Appl. No.: 152,993

[22] Filed: Feb. 8, 1988

[51] Int. Cl.⁴ .............................................. G08C 21/00
[52] U.S. Cl. ...................................................... 178/19
[58] Field of Search .................................... 178/19, 18

[56] References Cited

U.S. PATENT DOCUMENTS 4,088,842 5/1978 Ikedo ..................................... 178/19

Primary Examiner—Stafford D. Schreyer
Attorney, Agent, or Firm—Donald A. Streck; Wm F. Porter, Jr.

[57] ABSTRACT

A digitizer wherein the transduction frequency is controlled (automatically or manually) to minimize the interference effect of sources of external AC fields, such as CRT monitors. The digitizer implements the method of operation comprising the steps of, connecting a source of a frequency higher than the frequency to be employed as the transduction frequency of the digitizer to the first input of a counter; receiving input pulses from the source at the first input of the counter; outputting output pulses which are employed to generate the transduction frequency in the digitizer at an output of the counter; selectively setting an initial count value at a second input of the counter; and, repeatedly counting from the initial count value at the second input to a terminal value, outputting an output pulse upon reaching the terminal value, and resetting to the initial count value after outputting each output pulse. The preferred automated method includes reading and saving the induced position voltages being employed by the digitizer, testing the saved voltages for any flutter, and setting the initial count value to an optimum level.

15 Claims, 4 Drawing Sheets

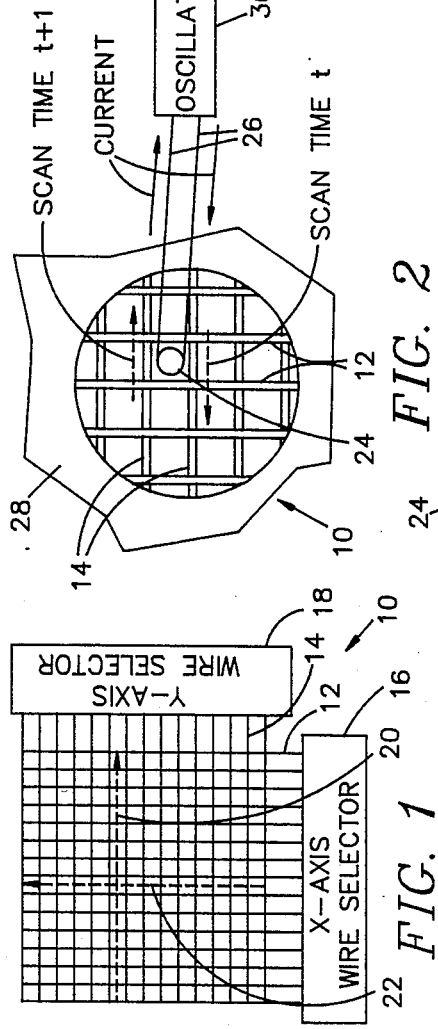
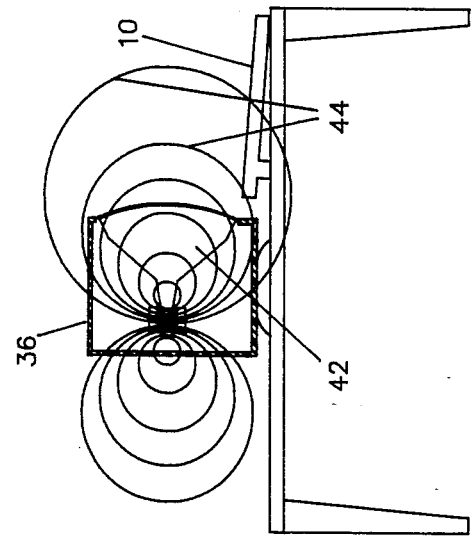
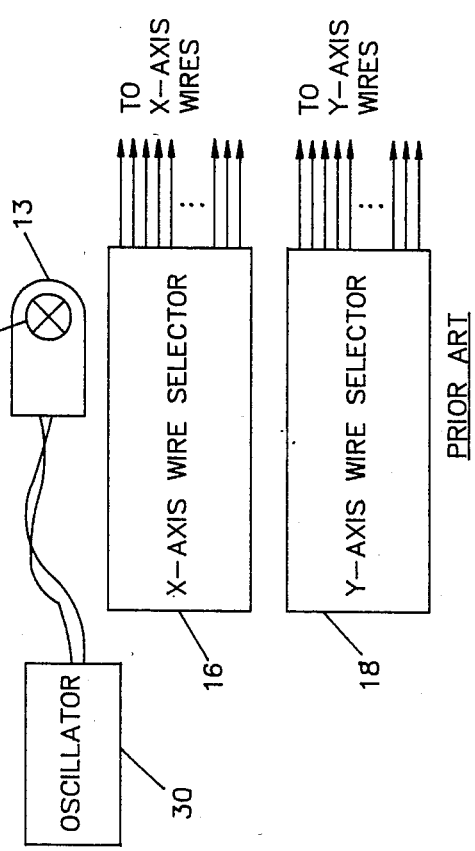

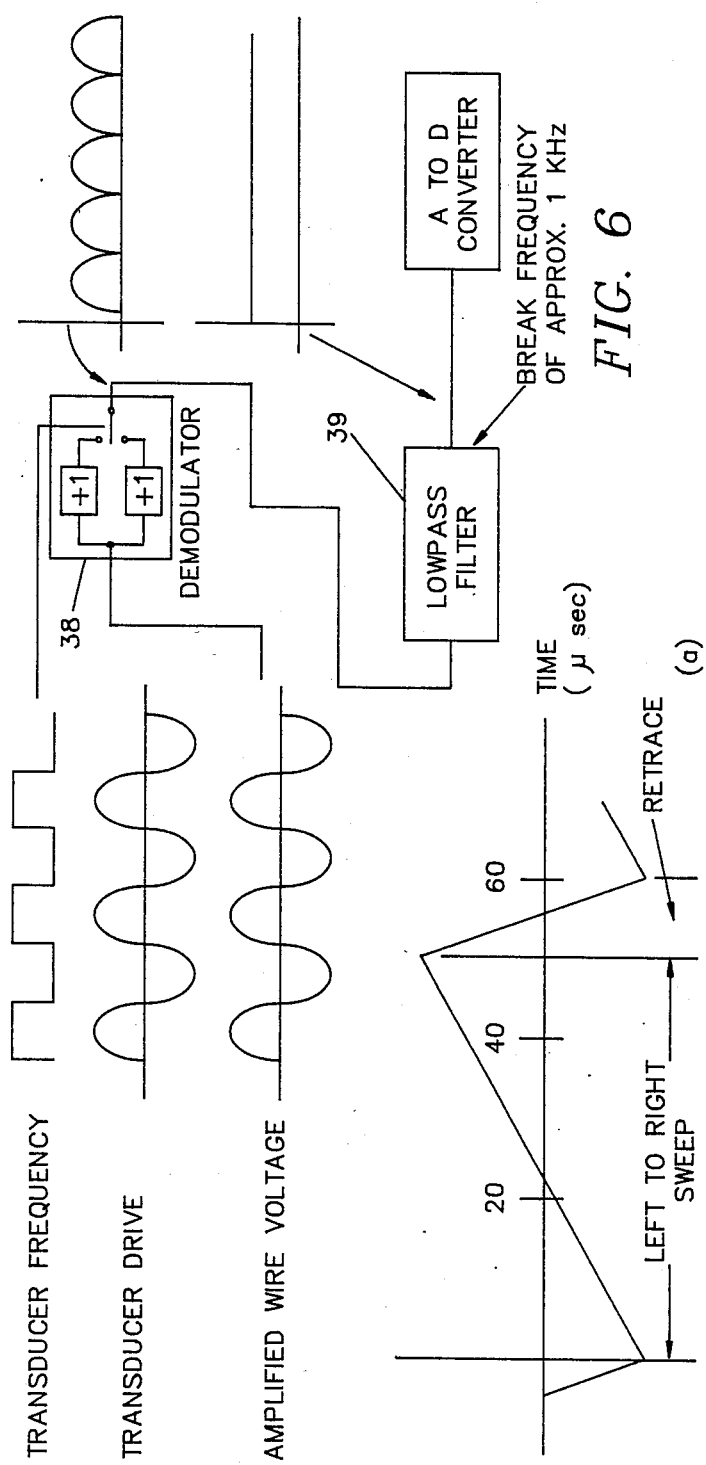
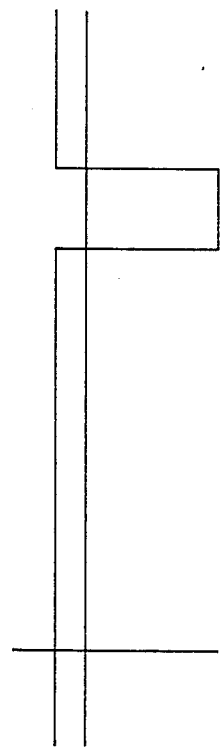
FIG. 6
FIG. 7

FREQUENCY SHIFTING DIGITIZER FOR REDUCING AC FIELDS INTERFERENCE

BACKGROUND OF THE INVENTION

The present invention relates to digitizing tablets and their manner of operation and, more particularly, to an improved digitizer employing induced voltages and having reduced interference caused by adjacent AC fields comprising, a frequency source capable of producing a plurality of frequencies suitable for use as a transduction frequency; a movable instrument including an electrical element of an electrical conductor; a tablet having a digitizing surface with one or more conductors disposed across the digitizing surface; means for determining the position of the movable instrument on the digitizing surface from voltages induced between the conductors and the electrical element at a transduction frequency; and, means for selecting the one of the frequencies to be employed as the transduction frequency wherein, with particularity, the means for selecting the one of the frequencies to be employed as the transduction frequency includes means for testing voltages induced between the conductors for flutter and for employing as the transduction frequency the one of the frequencies which minimizes any flutter.

Digitizing tablets (large and small) are popular support items for use with graphics-oriented systems such as CAD/CAM, and the like. Particularly in commercial grade operations, they afford a quick and accurate way to input positional information on a two-dimensional X-Y oriented surface. As shown in FIGS. 1 and 2, a typical digitizer 10 comprises a grid of equally spaced vertical X-axis wires 12 and horizontal Y-axis wire 14. The wires 12, 14 are generally spaced about 0.2-0.4 inches apart. the X-axis wires 12 are connected to an X-axis wire selector 16, while the Y-axis wires 14 are connected to a Y-axis wire selector 18. The wire selectors 16, 18 cause the wires 12, 14, respectively, to be selected in a time sequence as indicated by the dashed arrows 20, 22. One mode of operation for the digitizer 10 is depicted in simplified form in FIGS. 2 and 3. The X-axis wires 12 and Y-axis wires 14 are perpendicular to one another on alternate, non-touching layers. The reading of each layer is accomplished separately and comprises sensing the voltage induced by the oscillating magnetic field of the transducer 13 in each of the wires 12, 14. The transducer 13 (whether in the form of a "puck" or stylus) includes a coil of wire 24 having a pair of leads 26 therefrom on which a signal can be imposed by oscillator 30. As the coil of wire 24 within the transducer 13 is moved over the surface 28 of the digitizer 10, its position is detected by sensing the magnitudes and phases of the voltages on the wires 12, 14 buried within the digitizer 10 below the surface 28. With reference to FIG. 2 in particular, at scan time "t", current flowing in the coil 24 causes current flow in the wire 12 in one direction while in the wire 12 at can time "t+1" the induced current in the wire 12 causes current flow in the opposite direction. The change in current direction is indicative of which two wires 12, 14 the coil 24 is disposed between. In actual practice, the phase and magnitude of the induced wire currents are interpolated to determine the location at which a wire would have zero induced current and thus the location of the center of the transducer 13; but, such interpolation techniques are not important to the present invention and, therefore, will not be described in detail herein. In an alternate approach which is also not vital to the present invention, the wires 12, 14 are sequentially energized and the induced signal in the coil 24 is sensed to detect the coil (and associated transducer) position.

The problem addressed by the present invention is depicted with reference to FIGS. 4–5. Regardless of the approach employed, the coupling of AC magnetic fields between the coil 24 and the wires 12, 14 is the mechanism by which the position of the the coil 24 is determined. As shown in FIG. 4, it is typical to position the digitizer 10 close to the CRT display monitor 36 for ease of use; that is, an operator sits looking at the monitor 36 while employing the digitizer 10 to make positional inputs in real time. The potential for problem exists as shown in FIG. 5 and is a function of the monitor type, raster scan rate thereof, position relative to the digitizer, etc. As is known, the visual display on the monitor 36 is created by the continual sweeping from left to right and top to bottom of an electron beam across a phosphor surface on the inside of the CRT 36. What may not be generally realized and appreciated, however, is that the magnetic field from the beam deflection yoke in the monitor extends beyond the phosphor surface as indicated by the field lines 44. The flux of this field through the loop created by wires 12, 14 and their ground return to the tablet amplifier of the digitizer induces a small voltage therein. The effect of these magnetic fields may be understood with reference to FIG. 6. As depicted therein, the demodulator alternately applies gains of +1 and then −1 to the amplified grid signal, producing a signal with a DC level, which is positive if the demodulator input is in phase with the transduction frequency signal and negative if it is out of phase. This particular non-linear process of demodulation, like all non-linear processes where two signals are combined, produces new frequencies corresponding to the sum and difference of the two input frequencies.

The amplified wire voltage signal is effectively being multiplied by a square wave with a range of +1 to −1. Although this effective square wave contains frequency components of all odd multiples of its fundamental frequency, consideration of only the effects of this fundamental frequency is sufficient to illustrate the problem created by the monitor fields 44. Thus, a signal on the amplified wire voltage other than that coupled from the transducer 13 will, when combined in the demodulator 38 with the transduction frequency, produce frequencies at the demodulator output equal to the sum and difference of the extraneous signal and the transduction frequency. In the case of the adjacent monitor, the field produced by the horizontal sweep is similar to that depicted in FIG. 7a while the voltage induced into the grid wires 12, 14 by this field is the time derivative as depicted in FIG. 7b. This waveform can be shown to contain frequency components at higher multiples of its fundamental frequency. Thus, a 15.75 KHz monitor produces harmonics of 31.5, 47.25, 63.0, 78.75 KHz, and higher frequencies. A digitizer operating as indicated in FIG. 6 with a transduction frequency of 80 KHz would produce frequencies of 158.75 KHz and 1.25 KHz at the demodulator output in response to the 78.75 KHz harmonic. The lowpass filter 39 would effectively eliminate the 158.75 KHz component; but, would be ineffective at eliminating the 1.25 KHz component. Due to the large number of different brands and types of monitors and terminals, it is difficult to find a transduction frequency that is far enough from all the different monitor frequencies and harmonics to ensure stable digitizer operation.

As mentioned earlier, the wires 12, 14 are spaced apart and the precise position of the coil 24 is determined by interpolation between the two wires on opposite sides of it. Where resolution of 200–400 lines per inch is desired, the voltages induced into the wires 12, 14 by the deflection yoke fields 44 are insignificant compared to the changes in voltage per line of resolution. Where resolution in the neighborhood of 1000 per inch is desired, however, the induced voltages from the fields 44 can be significant, causing the signal being interposed to flutter, producing corresponding flutter in the computed position of the transducer 13.

It should be noted in passing that the use of multiple or various frequencies for transducer purposes, per se, is known in the part. Ikedo (U.S. Pat. No. 4,088,842) describes the use of multiple frequencies in the use of multiple transducers on the same digitizer. Both Ikedo and Rogers (U.S. Pat. No. 4,672,154) describe the use of multiple frequencies for communicating transducer switch activations to the digitizing tablet.

Wherefore, it is the principle object of the present invention to provide a general method and associated apparatus for the operation of a high resolution digitizer which eliminates or minimizes flutter caused by induced voltages from an adjacent display monitor, or the like.

Other objects and benefits of the present invention will become apparent from the description which follows when taken in conjunction with the drawing figures which accompany it.

SUMMARY

The foregoing object has been achieved in a digitizer wherein the position of a transducer or a digitizing surface is determined from voltages induced between conductors disposed across the digitizing surface and a coil carried by the transducer at a transduction frequency established by a frequency source, by the improvement of the present invention for reducing interference caused by adjacent AC fields comprising, counter means for receiving input pulses at a first input, for outputting output pulses employed to generate the transduction frequency source in the digitizer, and for receiving an initial count value at a second input, the counter means including logic for repeatedly counting from the initial count value at the second input to a terminal value, for outputting an output pulse upon reaching the terminal value, and for resetting to the initial count value after outputting each output pulse; a source of the maximum frequency to be employed to generate the transduction frequency connected to the first input of the counter means; and, means for selectably setting the initial count value at the second input.

In the preferred embodiment, the means for selectably setting the initial count value includes, first logic means for reading and saving the induced position voltages being employed by the digitizer to determine the position of the transducer; second logic means for testing the saved voltages for any flutter thereof and for exiting if no flutter is occurring and for transferring control to third logic means otherwise; third logic means for increasing by a fixed amount the initial count value presently being employed and for transferring control to the first logic means if all possible values of the initial count value have not been tried and for transferring control to fourth logic means if all possible values of the initial count value have been tried; and, fourth logic means for selecting and setting as the present value being employed the one of the initial count values which minimized the flutter of the induced position voltages being employed by the digitizer to determine the position of the transducer.

DESCRIPTION OF THE DRAWINGS

FIG. 1 is a simplified plan view of the grid employed within a typical X-Y digitizer.

FIG. 2 is an enlarged view of a portion of the grid of the digitizer of FIG. 1 and the associated sensing coil of the cursor and the manner of operation thereof.

FIG. 3 is a block diagram of the oscillator, transducer, and wire selector portions of a typical X-Y digitizer.

FIG. 4 is a simplified front elevation view of the environment as wherein the present invention is applicable.

FIG. 5 is a simplified partially cutaway side view of the apparatus of FIG. 4 illustrating the problem which can be created thereby.

FIG. 6 is a drawing combining waveforms and block diagrams to illustrate the effect of magnetic fields from a monitor adjacent a digitizer.

FIGS. 7a and 7b are graphs showing, respectively, the field produced by the horizontal sweep of the monitor and the voltage induced into the digitizer wires thereby.

DESCRIPTION OF THE PREFERRED EMBODIMENT

Figures 8, 9:
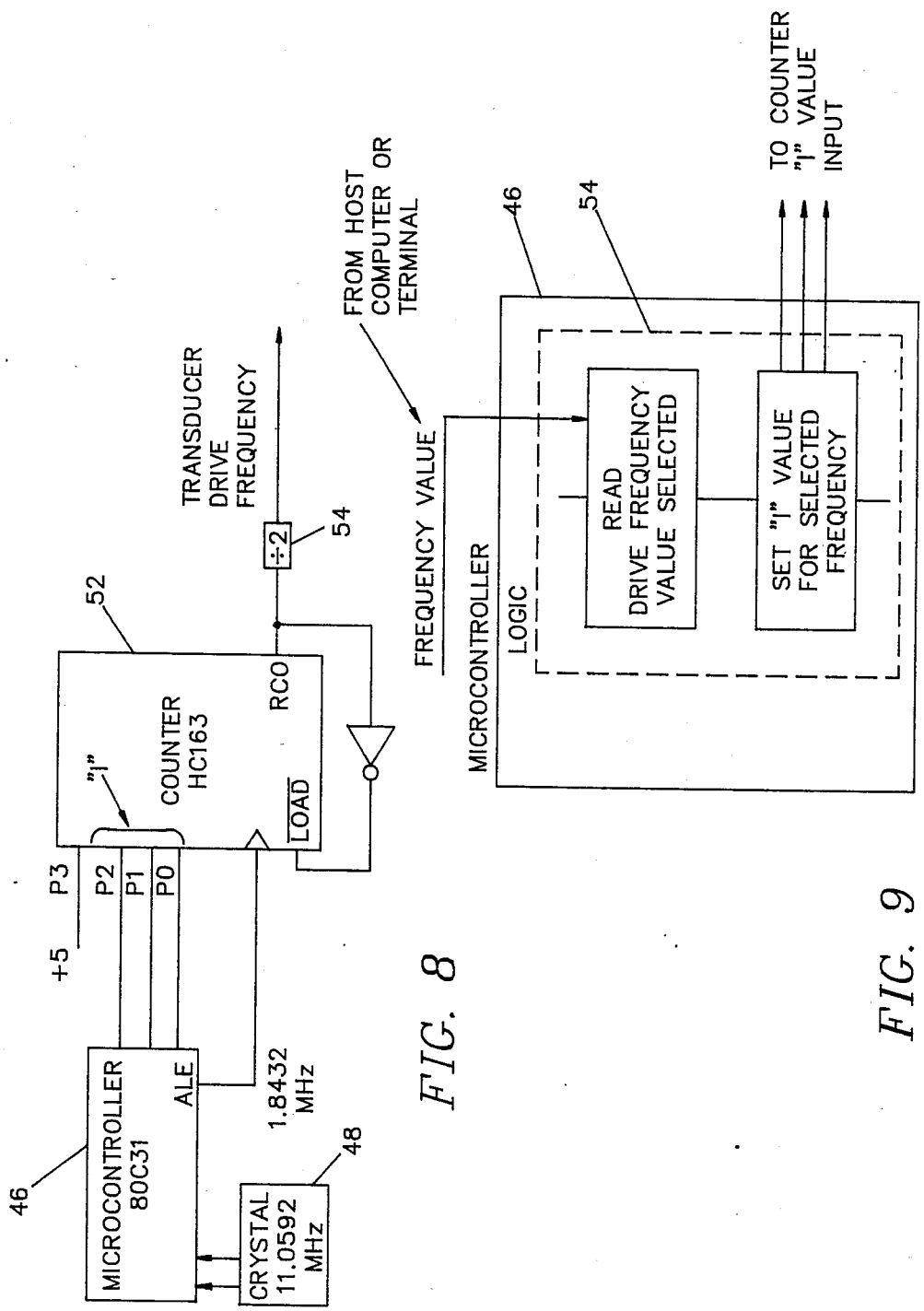
FIG. 8 is a block diagram of the apparatus of the present invention as employed in a tested embodiment thereof.
FIG. 9 is a block diagram of the environment wherein the apparatus of FIG. 8 is employed.

FIG. 8 shows a block diagram of circuitry as employed by the applicant herein in a commercial embodiment of the present invention employed in digitizers manufactured and sold by the assignee of this application. The present invention is based on the finding that the disruptive induced voltages from an adjacent monitor are the result of a so-called "beat frequency"; that is, whenever two frequencies are mixed together the result is the two original frequencies plus their sum and their difference. With regard to the flutter in the data caused by fields from an adjacent monitor, it was previously described herein that the flutter occurred at a beat frequecny which was the difference between the scanning frequency (and harmonics thereof) of the monitor and the scanning or strobing frequency employed within the digitizer. Since the scanning frequency of any given monitor is fixed, it was found that by modifying the transducing frequency of the digitizer, the flutter for any given monitor could be eliminated or, at least, greatly reduced, without significantly impairing the sensitivity and resolution of the digitizer.

The digitizers into which the present invention has been incorporated employ an 80C31 micro-controlled 46 therein for various functions. Accordingly, it was convenient to employ the micro-controller 46 to implement the present invention. The basic clock frequency of the system is provided by a 11.0592 MHz crystal 48 connected to the micro-controller 46. The 1.8432 MHz signal out of the ALE output of the micro-controller 46 is input to a model HC163 counter 52. Counter 52 is characterized by counting to fifteen from an initial value "I" as established by the binary number (i.e., "000"–"111") appearing on the three inputs P0–P2. The value of I can be input from a host computer, or the like, or be manually set by switches, jumpers, or such. Each time the counter 52 overflows, a pulse apppears at the RCO output thereof. That output is divided by two at 54 to provide the transducer drive frequency. By setting the value of "I" at respective ones of the values 0–7, frequencies of 57.6 KHz, 61.44, 65.82, 70.88, 76,8, 83.78, 92.16 and 102.4 KHz can be obtained.

As depicted in FIG. 9, in the presently tested commercial embodiment of applicant, the "I" value is manually established under operator or program control. The micro-controller 46 contains logic 56 which reads a drive frequency value selected by the operator or the program and outputs the appropriate "I" value (0–7) to the P0–P2 inputs of the counter 52.

Figure 10:
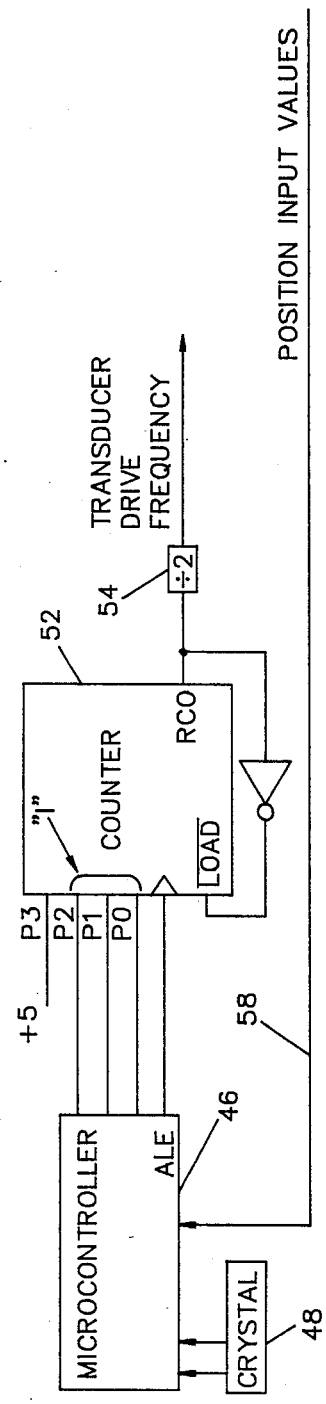
FIG. 10 is a block diagram of apparatus according to the present invention on a self-regulating version thereof.
Figure 11:
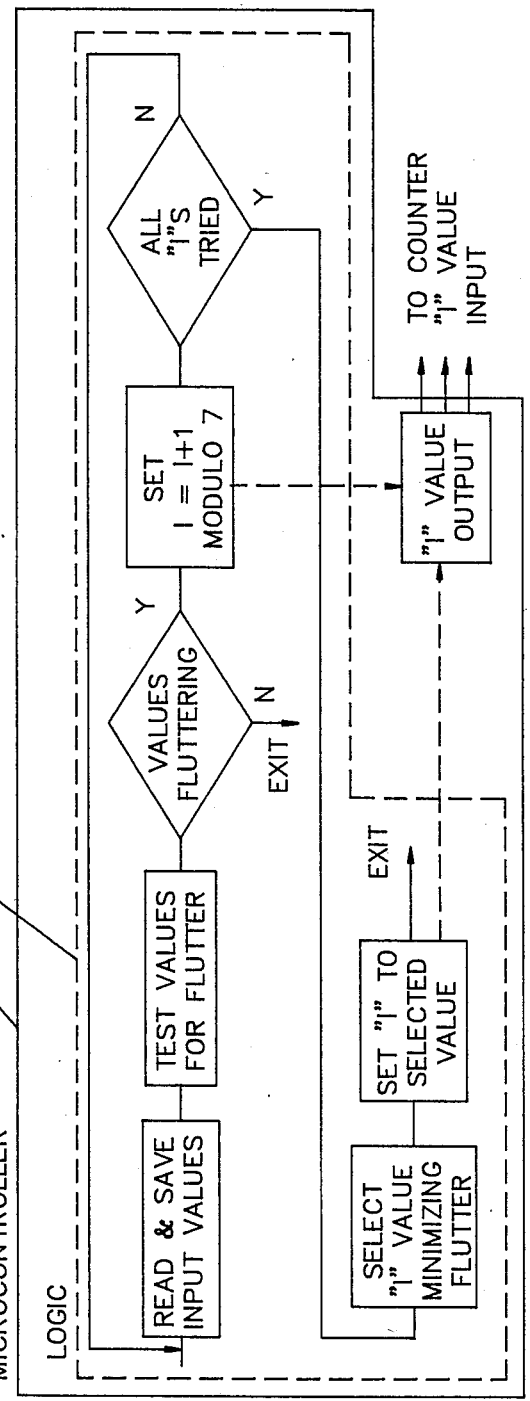
FIG. 11 is a flow chart of logic to be employed in the apparatus of FIG. 10 to effect automatic reduction or elimination of fluttering from monitor-induced voltages.

Turning now to FIGS. 10–11, an automated frequency selection system as contemplated by the applicant for future implementation is shown. The basic element as disclosed in FIG. 8 are once again employed; however, additionally the position input values being calculated are returned to the micro-controller 46 on multi-conductor bus 58 for use by additional logic 60 contained within micro-controller 46 as depicted in FIG. 11. As shown therein, the logic first reads and saves a history of consecutive input values and then tests the values for flutter. If the values are not fluttering (i.e., not indicating interference from the monitor) the logic simply exits. If fluttering is present, the logic sets the value of "I" to the next higher value (wrapping around from 7 to 0) and then checks to see if all the "I's" have been tried. If not, the logic returns to the point where a history of values is collected and tests for flutter once again. If all the "I's" have been tried, the logic selects the "I" value which minimized flutter and sets "I" in the counter 52 to that minimizing value.

Thus, it can be seen from the foregoing description that the present invention has accomplished its stated objective in two embodiments—manual and automated.

Wherefore, having thus described the present invention, what is claimed is:

1. In a digitizer wherein the position of a movable instrument on a digitizing surface is determined from voltages induced between one or more conductors disposed across the digitizing surface and an electrical element carried by a movable instrument at a transduction frequency established by a frequency source, the improvement for reducing interference caused by adjacent AC fields comprising:
   (a) counter means for receiving input pulses at a first input, for outputting output pulses employed to generate the transduction frequency source in the digitizer, and for receiving an initial count value at a second input, said counter means including logic for repeatedly counting from said initial count value at said second input to a terminal value, for outputting a said output pulse upon reaching said terminal value, and for resetting to said initial count value after outputting each said output pulse;
   (b) a source of a higher frequency than the transduction frequency connected to said first input of said counter means; and,
   (c) means for selectably setting said initial count value at said second input.

2. The improvement to a digitizer of claim 1 wherein said means for selectively setting said initial count value includes;
   (a) first logic means for reading and saving the induced position voltages being employed by the digitizer to determine the position of the movable instrument;
   (b) second logic means for testing the saved voltages for any flutter thereof and for existing if no flutter is occurring and for transferring control to third logic means otherwise;
   (c) third logic means for increasing by a fixed amount said initial count value presently being employed and for transferring control to said first logic means if all possible values of said initial count value have not been tried and transferring control to fourth logic means if all possible values of said initial count value have been tried; and,
   (d) fourth logic means for selecting and setting as the present value being employed the one of said initial count values which minimized the flutter of the induced position voltages being employed by the digitizer to determine the position of the movable instrument.

3. An improved digitizer employing induced voltages and having reduced interference caused by adjacent AC fields comprising:
   (a) a frequency source of a frequency higher than the frequency to be employed as a transduction frequency in the digitizer;
   (b) a movable instrument including an electrical element;
   (c) a tablet having a digitizing surface with one or more conductors disposed across the digitizing surface;
   (d) means for determining the position of said movable instrument on said digitizing surface from voltages induced between said conductors and said electrical element at a transduction frequency;
   (e) counter means for receiving input pulses at a first input, for outputting output pulses employed to generate said transduction frequency, and for receiving an initial count value at a second input, said counter means including logic for repeatedly counting from said initial count value at said second input to a terminal value, for outputting a said output pulse upon reaching said terminal value, and for resetting to said initial count value after outputting each said output pulse, said first input of said counter means being connected to said frequency source; and,
   (f) means for selectably setting said initial count value at said second input.

4. The digitizer of claim 3 wherein said means for selectably setting said initial count value includes:
   (a) first logic means for reading and saving the induced position voltages being employed by the digitizer to determine the position of the movable instrument;
   (b) second logic means for testing the saved voltages for any flutter thereof and for exiting if no flutter is occurring and for transferring control to third logic means otherwise;

(c) third logic means for increasing by a fixed amount said initial count value presently being employed and for transferring control to said first logic means if all possible values of said initial count value have not been tried and for transferring control to fourth logic means if all possible values of said initial count value have been tried; and, (d) fourth logic means for selecting and setting as the present value being employed the one of said initial count values which minimized the flutter of the induced position voltages being employed by the digitizer to determine the position of the movable instrument.

5. In a digitizer wherein the position of a movable instrument on a digitizing surface is determined from voltages induced between one or more conductors disposed across the digitizing surface and an electrical element carried by the movable instrument at a transduction frequency established by a frequency source, the improved method of operation for reducing interference caused by adjacent AC fields comprising the steps of:

(a) connecting a source of a frequency higher than the transduction frequency to the first input of a counter;

(b) receiving input pulses from the higher frequency source at the first input of the counter;

(c) outputting output pulses which are employed to generate the transduction frequency source in the digitizer at an output of the counter;

(d) selectively setting an initial count value at a second input of the counter; and, (e) repeatedly counting from the initial count value at the second input to a terminal value, outputting an output pulse upon reaching the terminal value, and resetting to the initial count value after outputting each output pulse.

6. The method of claim 5 wherein said step (d) of selectably setting an initial count value includes the steps of:

(d1) reading and saving the induced position voltages being employed by the digitizer to determine the position of the movable instrument;

(d2) testing the saved voltages for any flutter thereof and exiting if no flutter is occurring and transferring control to step (d3) otherwise;

(d3) increasing by a fixed amount the initial count value presently being employed and transferring control to step (d1) if all possible values of the initial count value have not been tried and transferring control to step (d4) if all possible values of the initial count value have been tried; and, (d4) selecting and setting as the present value being employed the one of the initial count values which minimized the flutter of the induced position voltages being employed by the digitizer to determine the position of the movable instrument.

7. In a digitizer wherein the position of a transducer on a digitizing surface is determined from voltage induced between one or more conductors disposed across the digitizing surface and an electrical element carried by a movable instrument at a transduction frequency established by a frequency source, the improvement for reducing interference caused by adjacent AC fields comprising:

(a) a frequency source capable of producing a plurality of frequencies suitable for use as the transduction frequency; and, (b) means for selecting the one of said frequencies to be employed as the transduction frequency including means for testing induced voltages for flutter and for employing as the transduction frequency the one of said frequencies which minimizes any flutter.

8. The improvement to a digitizer of claim 7 wherein said frequency source capable of producing a plurality of frequencies suitable for use as the transduction frequency comprises:

(a) counter means for receiving input pulses at a first input, for outputting output pulses employed to generate the transduction frequency source in the digitizer, and for receiving an initial count value at a second input, said counter means including logic for repeatedly counting from said initial count value at said second input to a terminal value, for outputting a said output pulse upon reaching said terminal value, and for resetting to said initial count value after outputting each said output pulse;

(b) a source of a higher frequency than the transduction frequency connected to said first input of said counter means; and, (c) means for selectably setting said initial count value at said second input.

9. The improvement to a digitizer of claim 8 wherein said means for selectably setting said initial count value includes:

(a) first logic means for reading and saving the induced position voltages being employed by the digitizer to determine the position of the movable instrument;

(b) second logic means for testing the saved voltages for any flutter thereof and for exiting if no flutter is occurring and for transferring control to third logic means otherwise;

(c) third logic means for increasing by a fixed amount said initial count value presently being employed and for transferring control to said first logic means if all possible values of said initial count value have not been tried and for transferring control to fourth logic means if all possible values of said initial count value have been tried; and, (d) fourth logic means for selecting and setting as the present value being employed the one of said initial count values which minimized the flutter of the induced position voltages being employed by the digitizer to determine the position of the movable instrument.

10. An improved digitizer employing induced voltages and having reduced interference caused by adjacent AC fields comprising:

(a) a frequency source capable of producing a plurality of frequencies suitable for use as a transduction frequency;

(b) a movable instrument including an electrical element;

(c) a tablet having a digitizing surface with one or more conductors disposed across said digitizing surface;

(d) means for determining the position of said movable instrument on said digitizing surface from voltages induced between said conductors and said electrical element at a transduction frequency; and, (e) means for selecting the one of said frequencies to be employed as the transduction frequency including means for testing induced voltages for flutter and for employing as said transduction frequency the one of said frequencies which minimizes any flutter.

11. The digitizer of claim 10 wherein said frequency source capable of producing a plurality of frequencies suitable for use as the transduction frequency comprises:
(a) a frequency source of a frequency higher than the frequency employed to generate the transduction frequency in the digitizer;
(b) counter means for receiving input pulses at a first input, for outputting output pulses operably connected and employed to generate said transduction frequency, and for receiving an initial count value at a second input, said counter means including logic for repeatedly counting from said initial count value at said second input to a terminal value, for outputting a said output pulse upon reaching said terminal value, and for resetting to said initial count value after outputting each said output pulse, said first input of said counter means being connected to said frequency source; and,
(c) means for selectively setting said initial count value at said second input.

12. The digitizer of claim 11 wherein said means for selectably setting said initial count value includes:
(a) first logic means for reading and saving induced position voltages being employed by the digitizer to determine the position of the movable instrument;
(b) second logic means for testing the saved voltages for any flutter thereof and for exiting if no flutter is occurring and for transferring control to the third logic means otherwise;
(c) third logic means for increasing by a fixed amount said initial count value presently being employed and for transferring control to said first logic means if all possible values of said initial count value have not been tried and for transferring control to fourth logic means if all possible values of said initial count value have been tried; and,
(d) fourth logic means for selecting and setting as the present value being employed the one of said initial count values which minimized the flutter of the induced position voltages being employed by the digitizer to determine the position of the movable instrument.

13. In a digitizer wherein the position of a movable instrument on a digitizing surface is determined from voltages induced between one or more conductors disposed across the digitizing surface and an electrical element carried by the movable instrument at a transduction frequency established by a frequency source, the improved method of operation for reducing interference caused by adjacent AC fields comprising the steps of:
(a) providing a frequency source capable of producing a plurality of frequencies suitable for use as the transduction frequency;
(b) testing induced voltages for flutter; and,
(c) employing as the transduction frequency the one of the plurality of frequencies which minimizes any flutter.

14. The method of claim 13 wherein said step (a) of providing a frequency source capable of producing a plurality of frequencies suitable for use as the transduction frequency includes the steps of:
(a) connecting a source of a frequency higher than the maximum transduction frequency to the first input of a counter;
(b) receiving input pulses from the source at the first input of the counter;
(c) outputting output pulses which are employed to generate the transduction frequency source in the digitizer at an output of the counter;
(d) selectively setting an initial count value at a second input of the counter; and,
(e) repeatedly counting from the initial count value at the second input to a terminal value, outputting an output pulse upon reaching the terminal value, and resetting to the initial count value after outputting each output pulse.

15. The method of claim 14 wherein said step (d) of selectably setting an initial count value includes the steps of:
(d1) reading and saving the induced position voltages being employed by the digitizer to determine the position of the movable instrument;
(d2) testing the saved voltages for any flutter thereof and exiting if no flutter is occurring and transferring control to step (d3) otherwise;
(d3) increasing by a fixed amount the initial count value presently being employed and transferring control to step (d1) if all possible values of the initial count value have not been tried and transferring control to step (d4) if all possible values of the initial count value have been tried; and,
(d4) selecting and setting as the present value being employed the one of the initial count values which minimized the flutter of the induced position voltages being employed by the digitizer to determine the position of the movable instrument.

* * * * *